(12) United States Patent
Matty (10) Patent No.: US 11,957,534 B1
(45) Date of Patent: *Apr. 16, 2024

(54) CUSTOM DENTAL ATTACHMENT PLACEMENT APPLIANCES AND APPLIANCE MANUFACTURING METHODS

(71) Applicant: Ormco Corporation, Orange, CA (US)

(72) Inventor: Richard Mark Matty, Alpharetta, GA (US)

(73) Assignee: Ormco Corporation, Orange, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/991,971

(22) Filed: Nov. 22, 2022

Related U.S. Application Data (63) Continuation of application No. 16/261,767, filed on Jan. 30, 2019, now Pat. No. 11,510,755.

(60) Provisional application No. 62/627,304, filed on Feb. 7, 2018.

(51) Int. Cl.
*A61C 7/08* (2006.01)

(52) U.S. Cl.
CPC ..................... *A61C 7/08* (2013.01)

(58) Field of Classification Search
CPC .............. A61C 7/08; A61C 7/146; A61C 7/16
See application file for complete search history.

(56) References Cited

U.S. PATENT DOCUMENTS

| | | | |
|---|---|---|---|
| 6,183,248 B1 | 2/2001 | Chishti et al. | |
| 6,309,215 B1 | 10/2001 | Phan et al. | |
| 6,830,450 B2 | 12/2004 | Knopp et al. | |
| 7,059,850 B1 | 6/2006 | Phan et al. | |
| 7,347,688 B2 | 3/2008 | Kopelman et al. | |
| 7,578,673 B2 | 8/2009 | Wen et al. | |
| 8,708,697 B2 | 4/2014 | Li et al. | |
| 9,597,164 B2 | 3/2017 | Li et al. | |
| 11,510,755 B2 * | 11/2022 | Matty | A61C 7/002 |
| 2008/0057460 A1 * | 3/2008 | Hicks | A61C 7/145 |
| | | | 433/20 |
| 2009/0280450 A1 * | 11/2009 | Kuo | A61C 7/08 |
| | | | 433/9 |
| 2018/0014916 A1 * | 1/2018 | Cinader, Jr. | A61C 7/146 |

OTHER PUBLICATIONS

Dr. Robert Axelrad, "What's a Buccal? Pronounced Buckle," Dr. Robert Axelrad and Associates, Jan. 29, 2013.

(Continued)

*Primary Examiner* — Ralph A Lewis
(74) *Attorney, Agent, or Firm* — Weiss & Arons LLP (57) ABSTRACT

A method of producing a custom dental anchor application appliance may be provided. The appliance may be for mounting one or more anchors to teeth of a patient. The appliance may be for use in orthodontic aligner treatment. The method may include forming a dental appliance. The forming may be done using a three-dimensional printing approach. The appliance may include a body. The body may include at least one anchor-locating area. The anchor-locating area may be shaped to conform to a mounting area on a surface of a tooth. The appliance may include a receiving structure. The receiving structure may be configured to removably support a dental anchor. The dental anchor may be of a predefined configuration in a fixed position and orientation relative to the body.

4 Claims, 9 Drawing Sheets

(56) References Cited

OTHER PUBLICATIONS

"Glossary of Dentistry," https://en.wikipedia.org/w/index.php?title=Glossary_of_dentistry&oldid=788823356, Wikimedia Foundation, Inc., Jul. 3, 2017.
"Mussel," https://en.wikipedia.org/wiki/Mussel, Wikimedia Foundation, Inc., Nov. 21, 2017.
"Definition of Pontic by Medical Dictionary," https://medical-dictionary.thefreedictionary.com/pontic, Farlex, Inc., Retrieved on Nov. 29, 2017.

\* cited by examiner

CUSTOM DENTAL ATTACHMENT PLACEMENT APPLIANCES AND APPLIANCE MANUFACTURING METHODS

CROSS-REFERENCE TO RELATED APPLICATIONS

This application is a continuation of U.S. patent application Ser. No. 16/261,767, which was filed on Jan. 30, 2019, which is a non-provisional of U.S. Provisional Patent Application No. 62/627,304, which was filed on Feb. 7, 2018, both of which are hereby incorporated by reference herein in their entireties.

FIELD OF TECHNOLOGY

This invention relates generally to the positioning and mounting of attachments on teeth for use with aligners during the course of orthodontic treatment. More specifically, this invention relates to custom-fitted attachment positioning and securing shells, and to the manufacture and use of such shells for the positioning and mounting of orthodontic attachments.

BACKGROUND

Conventionally, polymeric orthodontic positioning appliances, such as dental aligners, are used to reposition the teeth of patients. Such appliances are typically designed to cover the teeth, and, thereby, apply forces to the covered teeth. The forces cause the teeth to move towards an arrangement that an orthodontist determines to be ideal, or to otherwise satisfy a treatment objective. Such appliances include a thin polymer shell of elastic material. The material may conform to a patient's tooth configuration, but may be slightly out of alignment with an initial tooth configuration. Placement of the polymeric shell over the teeth applies controlled forces in specific locations. The controlled forces gradually move the teeth into a new configuration. Repetition of this process with successive appliances including new configurations eventually moves the teeth through a series of intermediate configurations to a final desired configuration.

There may be various goals associated with orthodontic treatment. Such goals may include moving the teeth of a patient as closely as possible to final tooth positions determined ideal for achieving the desired treatment result. Such goals may also include minimizing the time during which a patient must wear appliances used for the treatment. Such goals may further include minimizing patient office visits. Such goals may also include minimizing an amount of time orthodontic practitioners are required to treat the patients (colloquially, "chair time"). Aligners, when used in combination with attachments on the teeth, help attain the aforementioned goals during the course of treatment of a patient.

When a patient positions a positioning appliance, such as an aligner, over a prescribed group of teeth, one or more of the teeth will provide a base—i.e., anchor region—for holding the positioning appliance in place while the stiffness of the polymeric material imparts a resilient repositioning force against one or a portion of the remaining teeth. By designing the appliance to cover the teeth, a much larger contact surface area is afforded compared to traditional orthodontic treatment using brackets and wires.

However, such anchoring and repositioning abilities of removable elastic positioning appliances still depend on the native tooth surfaces and other dental features of the patient's teeth. This inadequacy to provide sufficient anchoring on the teeth to be repositioned is a drawback and often prevents using aligners to treat patients requiring more complicated forces or movements. For example, shell-like polymeric positioning appliances have difficulty applying certain forces to individual teeth, such as extrusive force (e.g., pulling or raising a tooth relative to the jaw).

To overcome these limitations, conventional aligner treatment uses one or more attachment devices (typically referred to as attachments). The attachments are bonded to preselected attachment points on the teeth or dental features in order to provide the appropriate physical leverage. Attachment devices coupled to teeth have been utilized in orthodontic treatment. Attachment devices can also improve force delivery and/or repositioning of the teeth, e.g., with shell-shaped appliances. Specific design and location of attachment devices provide attainable and more effective repositioning forces, anchoring ability and appliance retention that would otherwise not be possible without the use of the attachment. Attachment devices in combination with removable dental positioning appliances provides the patient with the benefits of removable appliances while retaining the ability to intrude/extrude, rotate, and otherwise manipulate teeth that require more difficult movements. In the past, conventional systems required braces to provide the more difficult movements.

Attachments are typically constructed of varying materials, shapes and sizes, and can be bonded to the labial or lingual surfaces of teeth in order to interact with aligners in a variety of different ways. Attachments can be applied to a patient's teeth prior to treatment with aligners. Attachments are precisely placed and secured to teeth using adhesives, flexible bands and/or connecting ligatures.

Attachments may be fabricated prior to tooth attachment. Attachments may also be substantially assembled at the orthodontic practitioner's office prior to, or in conjunction with, positioning on the patient's tooth (e.g., molded composites, etc.).

Conventional techniques for both creating attachments and securing the attachments to teeth have been shown to be inefficient, time-consuming and error-prone. The expertise of the orthodontist, the application of dental adhesives and the application of curing lights are also often required when creating attachments and securing the attachments to teeth. Positioning attachments individually can be time consuming, and require careful handling to ensure precise placement. Proper placement of attachments may ensure proper engagement and interaction of the attachment with a designed feature on the aligner. The designed feature may provide a desired physical leverage which creates a desired force on a tooth to produce a specific movement of the tooth during treatment.

In some instances where attachments are utilized, errors may occur as attachments made by the practitioner may not always conform to a prescribed or ideally desired shape and/or may not bond in the optimal location or orientation necessary to engage one or more features on the prescribed aligner as digitally designed. Accordingly, the desired effect of including the attachment in treatment may not be realized. Manufacturing limits, errors in attachment or appliance formation (e.g., attachment-receiving well of an appliance) may lead to error in appliance/attachment engagement, such as misalignment or less than ideal coupling between an attachment and appliance. Accordingly, a corresponding orthodontic appliance may not ideally couple or engage with the attachment as intended, leading to errors in force delivery and the patient's orthodontic treatment.

These limitations in the design and application of attachments do not further the goals of orthodontic treatment, specifically minimizing the time of the orthodontic practitioners treating patients (chair time) and often lead to increased office visits necessary for their application.

One prior art solution was created to remedy some of the above described problems associated with attachment design, installation, and interaction with the aligner by modulating a fit between an attachment and an aligner. This solution includes an attachment-based orthodontic treatment system including disposing or positioning a tactile object relative to the attachment and attachment engaging portion (e.g., attachment-receiving well) of the orthodontic appliance so as to affect engagement between the attachment and the orthodontic appliance. For example, a tactile object can be disposed at least partially between the attachment and attachment receiving well of the appliance. This prior art solution does not solve the problem of initially securing an attachment with precision and accuracy so as to increase the quality of a fit of the attachment to the orthodontic appliance. Rather, it overlooks the need for precision in the installation of attachments, assumes these issues are insurmountable and proposes including tactile objects inside aligners to diminish the effects created by the above described mounting issues.

Aligner treatment includes, and plans for, the use of attachments during the staging and digital design of the treatment plan. Therefore, aligners are manufactured with features for interacting with attachments to be applied by the orthodontist.

Accordingly, it would be desirable to provide a system for securely applying attachments to the teeth including a polymeric shell aligner preloaded with attachments that can be easily applied to the arch of a patient, and simultaneously secure all attachments in place prior to treatment with minimal orthodontist oversight and chair time. It would be further desirable to provide a system for patient-applyable and patient-removable attachments, thereby removing the necessity for an office visit by the patient.

SUMMARY

A method for using a custom dental orthodontic aligner treatment is system is provided. The method may include receiving a three-dimensional scan of a patient's teeth. The method may include computing a sequence of aligners required to conform the patient's teeth to a desired formation. The method may include computing a size and a location of at least one anchor required to secure each aligner of the computed sequence of aligners.

The method may include three-dimensionally printing a non-treatment aligner. The non-treatment aligner may be for mounting the at least one anchor to the patient's teeth.

The non-treatment aligner may include a body. The body may include at least one anchor-locating area.

The non-treatment aligner may include a receiving structure. The receiving structure may be located within a predetermined vicinity of the anchor-locating area. The receiving structure may hold the at least one dental anchor. The receiving structure may hold the at least one dental anchor in a predefined configuration. The receiving structure may hold the at least one dental anchor in a fixed position and/or orientation relative to the body. The fixed position and/or orientation may bring a mounting surface of the at least one anchor into contact with a mounting area on a surface of at least one of the patient's teeth when the mounting surface of the anchor is in conforming contact with the mounting area on the surface of the tooth. The receiving structure is configured to release the anchor from the body after the anchor is bonded to the tooth.

The non-treatment aligner may include a releasable adhesive. The releasable adhesive may be located between the at least one anchor and the body.

The non-treatment aligner may include a second adhesive. The second adhesive may be located on the mounting surface of the anchor.

The method may include three-dimensionally printing a first aligner. The first aligner may be included in the sequence of aligners. The first aligner may include pressure-sensitive sensors.

The method may include transporting the non-treatment aligner and the first aligner to the patient.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

A custom dental anchor application appliance is provided. The appliance may enable one or more anchors (also referred to herein as "attachments") to be mounted to the teeth of a patient. The anchors may be for use in orthodontic aligner treatment.

The appliance may include a body. The body may have at least one anchor-locating area. The anchor-locating area may be shaped to conform to a mounting area on the surface of a tooth. The anchor-locating area may include a receiving structure and/or a receptacle (described in further detail below). The anchor-locating area may include an area partially or completely surrounding a receiving structure and/or receptacle. The anchor-locating area may include any other suitable area.

The body may include a receiving structure. The receiving structure may be located within the anchor-locating area. The receiving structure may be coated, partially or completely, with a layer of releasable dental adhesive. The receiving structure may hold an anchor in a predefined configuration. The predefined configuration may be at a fixed position and orientation relative to the body. The predefined configuration may bring a mounting surface of the anchor into contact with the mounting area on a surface of the tooth. The mounting surface of the anchor may be brought into conforming contact with the mounting area on the surface of the tooth. The receiving structure may be configured to release the anchor from the body at some predetermined time, or in response to some predetermined stimuli, after the anchor has been bonded to the tooth.

The body may include a shell. The shell may have a plurality of cavities. A cavity may include geometries. The geometries may be shaped to receive teeth. A cavity may include a receiving structure. In certain embodiments, the predefined configuration may be considered as one of the cavities.

A method for applying a dental anchor may also be provided. The method may include placing an appliance such that the anchor-locating area conforms to a mounting area on the surface of a tooth. The anchor may be removably secured to the body using a pressure-sensitive adhesion device. The anchor may include a layer of removable cement, or any other suitable releasable dental adhesive, for bonding the anchor to the tooth.

In some embodiments, the anchor may include a layer of conventional dental cement. The cement may be used to bond the anchor to the tooth.

The method may include applying a curing light to the body, or some portion of the body, of the appliance. The curing light may be applied to the body of the appliance after the appliance is placed on the teeth. The curing light may be applied to the portion of the appliance that holds the anchor. Upon completion of the curing of the removable cement or other suitable releasable or non-releasable dental adhesive, the body of the appliance may be removed from the teeth. The anchor may remain adhered to the teeth after removal of the appliance.

In certain embodiments, the shape of the anchor may be a first shape. The shape of the receiving structure may be a second shape. In such embodiments, the first shape may not conform to the second shape. The first shape and the second shape may be different shapes.

A custom dental orthodontic aligner treatment system may be provided. The system may include receiving a three dimensional scan of a patient's teeth.

The system may include computing a sequence of aligners. The sequence of aligners may be required to manipulate the patient's teeth to a desired formation. The system may include computing a size and a location of at least one anchor. The at least one anchor may be used to secure each aligner of the computed sequence of aligners. The at least one anchor may be used to secure one or more aligners of the computed sequence of aligners.

The system may include three-dimensionally printing a non-treatment aligner. The non-treatment aligner may be for mounting the at least one anchor to the patient's teeth. The non-treatment aligner may include a body having at least one anchor-locating area. The anchor-locating area may be shaped to conform to a mounting area on the surface of a tooth. The non-treatment aligner may include a receiving structure.

The receiving structure may hold the anchor in a predefined configuration. The predefined configuration may include a fixed position and orientation relative to the body. The predefined configuration may bring a mounting surface of the anchor into conforming contact with the mounting area on the surface of the tooth.

The non-treatment aligner may include a releasable adhesive. The releasable adhesive may be positioned between the anchor and the body. The non-treatment aligner may be patient-applyable. The non-treatment aligner may be patient-removable.

The non-treatment aligner may include a second adhesive. The second adhesive may be located on the mounting surface of the anchor. The second adhesive may be removable cement.

The second adhesive may be constituted of or include an engineered marine mussel protein. It should be appreciated that an adhesive containing a mussel protein may be easily removable—e.g., with an infrared or ultraviolet light. Therefore, an adhesive containing an engineered marine mussel protein may be a desirable adhesive in order to enable a patient to remove the anchor absent practitioner involvement.

Marine mussels secrete a glue-like sticky material, known as byssus, which is responsible for the strong adhesion to rocks and other surfaces in a turbulent marine environment. The byssus is a bundle of thread-like materials that spreads out in a radially outward direction. It consists of four parts, namely, plaque, thread, stem, and root. Mussel byssus is proteinaceous. In other words, mussel byssus is a protein derived from marine mussels. Byssal threads are attached to the root at the base of mussel foot where a combination of 12 retractor muscles controls the tension in them. More than 25 different mussel foot proteins (mfp) have been identified in byssus, out of which 5 (mfp-2 to mfp-6) are unique to plaque. These 5 mfp have a high content of the usually rare modified amino acid 3, 4-dihydroxy-L-phenylalanine (hereinafter "DOPA")

(1)

As shown in (1) above, DOPA includes a catechol moiety. When combined with oxidant cations from seawater under basic pH conditions, catechol oxidation of the catechol moiety of DOPA produces quinine. The quinine can form a cross-linked polymer matrix in the bonding network. Further, when bonding to rocks, the catechol moiety of DOPA may undergo chelation with inorganic oxides found in the rock. Cohesion between molecules of DOPA is aided by multivalent cations, such as $Fe^{3+}$ and $Ca^{2+}$ ions. These cations form metal complexes between non-oxidized catechols of DOPA and facilitate wet adhesion of the bonding network in seawater. It has been found that it is the catechol functionality of DOPA that gets attached with external surface during the adhesion process and so at least facilitates the adhesion of the mussel to a variety of substrates, including wood, metal, and mineral surfaces, among others, when submerged in seawater. Embodiments of an orthodontic adhesive system include selected engineered marine mussel proteins or similar components so as to mimic the attachment and/or detachment functionality of the mussel in the oral environment. The engineered marine mussel protein may be synthesized or may be genetically engineered.

In an exemplary embodiment, the engineered marine mussel protein of the orthodontic adhesive system may include a monomer having a catechol moiety and/or a catechol-like moiety and therefore have similar properties to DOPA, as is shown in (1). The catechol moieties and/or catechol-like moieties of the orthodontic adhesive system include nitrocatechol or one or more nitrocatechol derivative-containing compounds, which provide chelation, self-polymerization, and crosslinking functionality. By way of further example, an exemplary catechol-like containing compound may have a wet adhesive group that binds to enamel. The wet adhesive group may include one or more functional monomers that crosslink with other components of the adhesive system. The functional monomers include at least one of a phosphonate and a cyclic disulfide moiety, both of which can undergo a reaction with a polymerizable group of the monomer.

In one embodiment, the bond between the nitrocatechol derivative moiety and the biologically acceptable polymer may be cleaved upon exposure to light. In this way, the orthodontic adhesive system may be capable of being debonded via light exposure. By way of example, the layer may include a photocleavable moiety. In that regard, exposing the bond between the nitrocatechol derivative-containing compound and the biologically acceptable polymer to IR light may weaken or break the bond. By way of example, a typical orthodontic bracket may be bonded to the tooth and achieve a shear strength of from 10 MPa to 20 MPa. IR or UV light exposure may reduce that shear strength to 1 MPa or less. As a result, the nitrocatechol derivative may remain attached to the surface while the biologically acceptable polymer becomes detached from the nitrocatechol derivative moiety. As applied to the embodiment, for example, when exposed to IR light, the layer may denature, in which case the layer may break down so that the attachment and the layer may be released from the tooth. Following debonding, an additional layer may remain on the tooth surface. Thus, during treatment, a dental attachment may be strongly adhered to the teeth of a patient when desired, but then may also be easily removed from the teeth when treatment is completed or when the device needs repositioning or replacement, by exposing the adhesive to an IR light source.

The system may include three-dimensionally printing a first aligner in the sequence of aligners. The non-treatment aligner and/or the first aligner may include pressure-sensitive sensors or any other suitable sensors. The sensors may determine teeth placement and pressure information. The information may be transmitted to a computing system. The information may be transmitted to a computing system via a Bluetooth connection between the sensors and a patient's mobile device. The patient's mobile device may then transmit the information to the computing system. In some embodiments, the sensors may be used to provide information regarding teeth placement, pressure on teeth and ongoing tooth movement.

The transmitted information may be used to compute a second treatment aligner. The second treatment aligner may also include sensors. The sensors may operate in a similar fashion to the sensors on the first treatment aligner.

A detection instrument may emit input signals to resonate the two inductive electrodes of the sensors such that an output signal is emitted by the sensors in return. The detection instrument thereafter collects the output signals emitted by the sensors and passes the pressure information on to a treatment tracking software application. The treatment tracking software application may thereafter be used by the orthodontist or treatment professional in treating the patient. The treatment tracking software application may be used by a three-dimensional appliance printing system to create a subsequent appliance.

In an embodiment of the invention, the detection instrument interacts with the sensors in an office setting, such as the orthodontist's office or clinic. In another embodiment of the invention, the detection instrument is provided to the patient for use in a home environment and the detection instrument is configured to pass the pressure information over a network such as the Internet to the treatment tracking software application residing in the orthodontist's office or clinic. Thereafter, the orthodontist or treatment professional may review the pressure information without the patient in the office, saving time and resources for both the patient and the orthodontist. In some scenarios, the detection instrument may not be configured to pass pressure information directly from the patient's home to the orthodontist's office. As such, the patient may also be provided with a communication device for facilitating the transfer of information from the detection instrument to the treatment tracking software application. For example, the communication device may include a cellular network interface card or another mechanism for passing information between the detection instrument and the treatment tracking software. The communication device may comprise the patient's own computing device, such as a smartphone or a tablet computer, with an application installed thereon to facilitate communication between the patient's computing device and the treatment tracking software application. In an embodiment of the invention, the detection instrument may be the patient's own computing device with an application installed thereon. In this embodiment, the particular signal generating and receiving features of the underlying personal computing device are utilized, such as near field communication (NFC) technology or similar.

The system may include transporting the non-treatment aligner and the first aligner to the patient. After bonding the anchor the body, the receiving structure may be configured to release the anchor from the body.

Illustrative embodiments of apparatus and methods in accordance with the principles of the invention will now be described with reference to the accompanying drawings, which form a part hereof. It is to be understood that other embodiments may be utilized and that structural, functional and procedural modifications may be made without departing from the scope and spirit of the present invention.

Figures 1A, 1C:
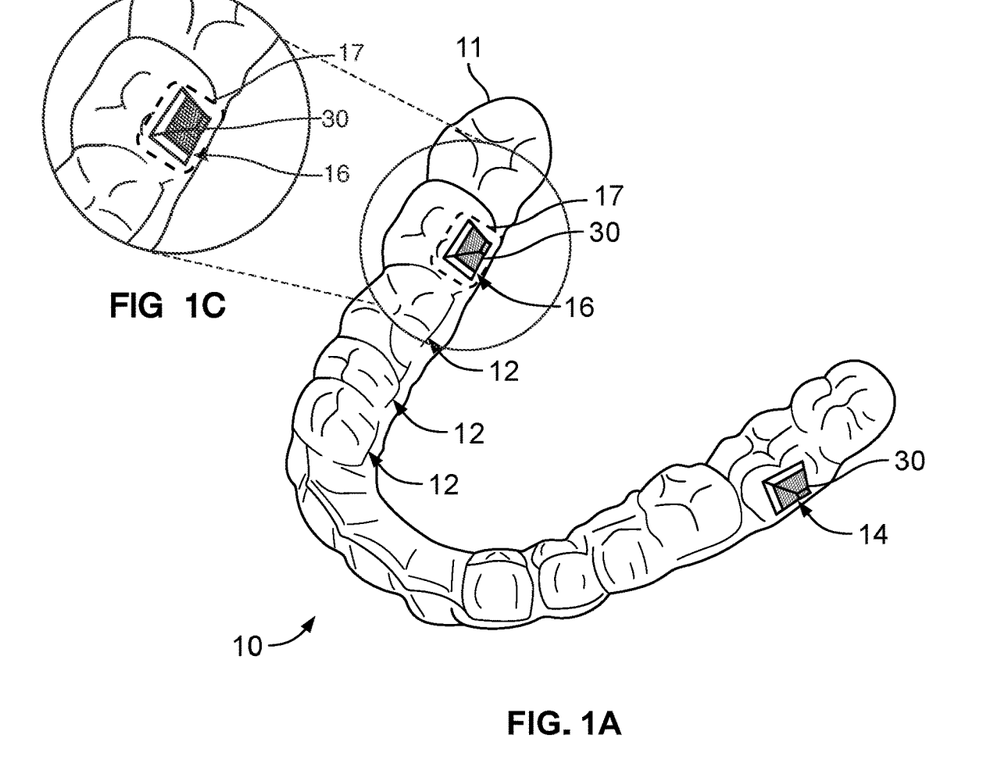
FIG. 1A shows an illustrative, top down view of an appliance according to certain embodiments.
FIG. 1C shows an illustrative, enlarged view of a portion of an appliance according to certain embodiments.
Figure 1B:
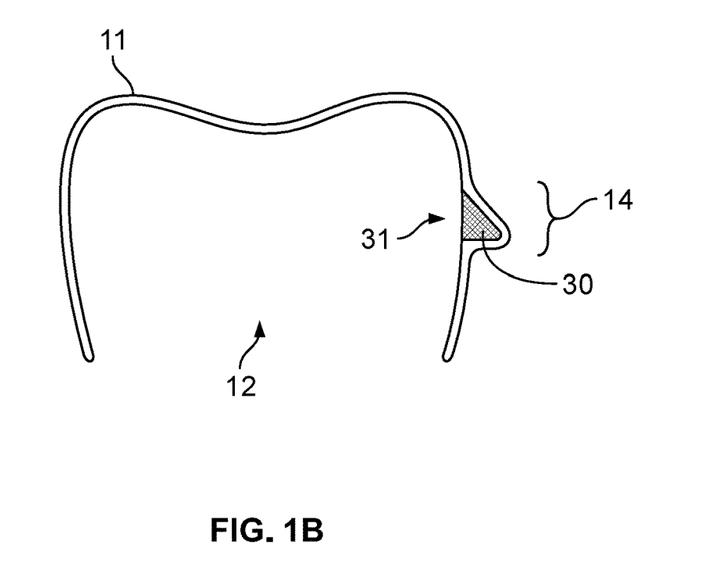
FIG. 1B shows an illustrative, elevational view of an appliance according to certain embodiments.

FIGS. 1A, 1B and 1C illustrate an embodiment of polymeric shell appliance 10. Polymeric shell appliance 10 may be used in securing attachments on a patient's teeth. Shell appliance 10 includes body 11. Body 11 may be formed of a unitary piece of material or printed using a stereolithography (SLA) process. Body 11 may include cavities 12. Cavities 12 may be configured to conform to surfaces of the patient's teeth and to geometries shaped to receive and reposition the patient's teeth from one arrangement to a successive arrangement. Receptacles 14 and 16 may be designed into one or more cavities 12 of body 11. In some embodiments, receptacles 14 and/or 16 may be receiving structures. The areas of body 11 that include and/or surround receptacles 14 and/or 16 may be named anchor-locating areas. Anchor-locating area 17 may be shown in FIGS. 1A and 1*n* FIG. 1C. An anchor-locating area may be a portion of appliance 10 for identifying a location on the patient's teeth in order to place one or more anchors and/or attachments. Anchor-locating area 17 may be an example of an anchor-locating area.

Polymeric shell appliance 10 is shown holding an orthodontic appliance, such as attachment 30. Attachment 30 includes bonding base 31.

FIG. 1C shows an enlarged view of a portion of appliance 10. Anchor-locating area 17 may be larger and/or smaller that what is shown in FIG. 1C. Anchor-locating area may be physically defined on appliance 10. A physically defined anchor-locating area may include an etching or dotted line on appliance 10. Anchor-locating area may be not be physically defined on appliance 10. In some embodiments, anchor-locating area 17 may include the entirety of appliance 10.

Figure 2:
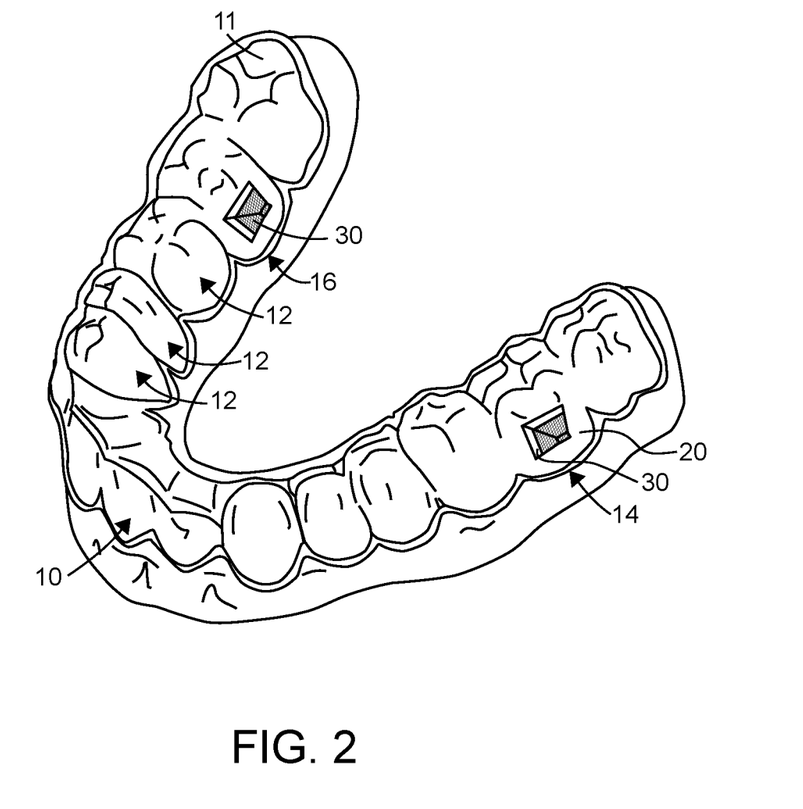
FIG. 2 shows an illustrative, top-down view of an appliance according to certain embodiments.

FIG. 2 shows polymeric shell appliance 10 holding attachment 30 with bonding base 31 against the labial side of tooth 20. The hold is in the position in which attachment 30 was designed to function as part of an orthodontic aligner treatment. While attachments are currently the type of appliance most often used with aligners, polymeric shell appliance 10 may be used to position and bond other types of structures on teeth, such as brackets. Attachment 30, when bonded to tooth 20 by base 31, may interact with one or more aligners during the course of treatment.

Polymeric shell appliance 10 may be made using any suitable economical rigid material. The material should preferably be biocompatible with the oral environment. The material should preferably be resilient and provide effective reposition forces to the teeth to effect tooth movement relative to the pre-treatment location of the tooth. It should be appreciated that an initial aligner used to place and bond attachments may be a non-treatment aligner—i.e., the initial aligner's function may be to bond attachments to teeth and not to move teeth. A subsequent aligner may be applied after the initial aligner's placement. The subsequent aligner may apply forces and effect treatment, such as tooth movement. The material used to manufacture shell appliance 10 should preferably be capable of being formed with cavities 12 to conform to the shape of the patient's teeth. The material should preferably be capable of being formed with receptacles 14 and/or 16. Receptacles 14 and/or 16 may preferably conform to the shape of the desired attachments. The attachments may be pre-loaded into the receptacles in advance of aligner treatment.

In some embodiments, polymeric shell appliance 10 may be molded from thermoplastic material—i.e., substances that can be re-melted back into a liquid form. In other embodiments, polymeric shell appliance 10 may be molded from thermosetting material—i.e., substances that set permanently when heated by applying the thermosetting material to a positive dental mold of the patient's teeth under the application of heat. Polymeric shell appliance 10 may be molded from any other suitable moldable material. During the molding process, the mold may be formed by computer-controlled equipment to conform to the three-dimensional portion of a crown of the patient's tooth. The mold may be further formed to include a template of an attachment located on or close to the three-dimensional portion of the crown. In some embodiments, polymeric shell appliance 10 may be 3D printed.

Figure 3A:
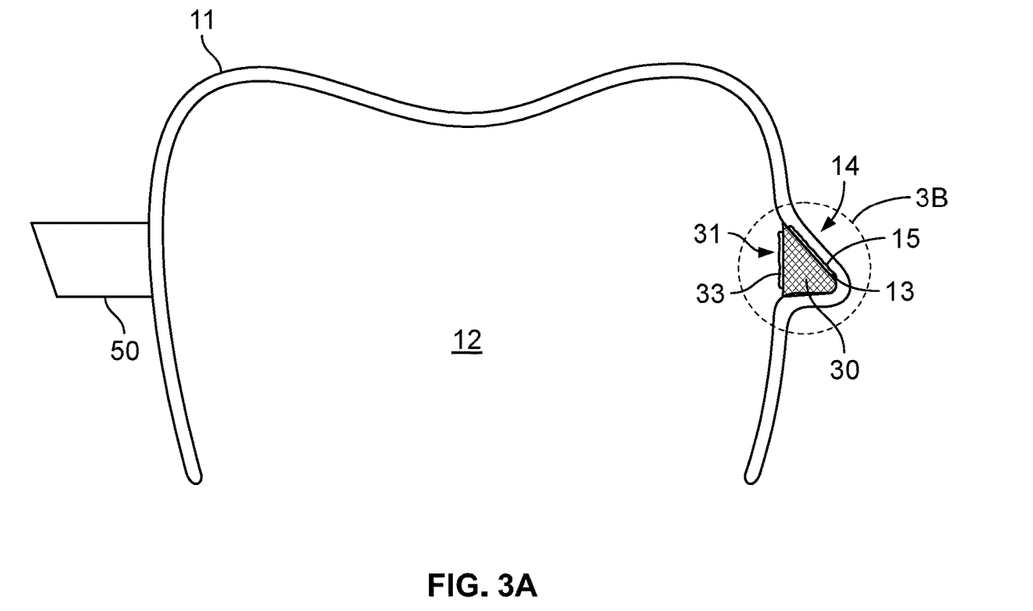
FIG. 3A shows an illustrative, elevational view of an appliance with an attachment (or anchor) according to certain embodiments.

FIG. 3A shows an elevational view of appliance 10. According to one embodiment, releasable adhesive or coating 15 contacts a portion of surface 13 that lines receptacle 14 (and receptacle 16) and a portion of attachment 30 thereby releasably supporting the attachment 30 in receptacle 14. Adhesive 15 may be configured to hold attachment 30 within the shell during transport—e.g., shipping—to the orthodontist and/or patient. Adhesive 15 may securely hold attachment 30 until the attachments are mounted to the patient's teeth prior to start of aligner treatment.

The shell may be shipped together with a plurality of aligners for each respective stage of treatment. Releasable adhesive 15 may be any of several types of adhesive, such as a pressure sensitive adhesive, which retains the attachment in the receptacle while permitting detachment under the application of a requisite force, such as a pressure sensitive adhesive.

In some embodiments, releasable adhesive 15 may be a type of adhesive which retains the attachment in the receptacle while permitting detachment under the application of a liquid, such as water or saliva. In this embodiment, the attachment may detach from the receptacle when placed in the liquid environment. Such a liquid environment may include a patient's mouth.

According to one embodiment, curable dental adhesive 33 may be pre-applied to base 31 of attachment 30. Curable dental adhesive 33 may be used to bond attachment base 31 to the tooth surface when the shell appliance 10 is placed over the arch of the patient during attachment installation.

Alternatively, the orthodontist and/or patient can apply dental adhesive 33 to base 31 of attachment 30 prior to placing appliance 10 over the patient's arch and bringing attachment 30 into contact with tooth 20. Any suitable adhesive may be used to bond orthodontic appliances to teeth. An exemplary adhesive may include a type of adhesive applied by the practitioner prior to placing the shell appliance on the teeth. Another exemplary adhesive may include a type of adhesive that is pre-applied to the attachments upon manufacture. In certain embodiments, shell appliance 10 may be manufactured with adhesives 33 and 15 by the supply company prior to being provided to the orthodontic practitioner.

According to another embodiment, handle structure 50 may be provided on body 11 of polymeric shell appliance 10. Handle structure, if provided, is preferably located on an outer, labial-facing, surface of body 11. Although handle structure 50 is shown on a lingual-facing side in FIG. 3A, it may be preferable for handle structure 50 to be located on an outer, labial-facing surface, for ease of use. Handle structure 50 may be configured to be graspable by the patient or orthodontist. Handle structure 50 may have a paddle shape or any other suitable shape for grasping. Handle structure 50 may provide a convenient means of removing the shell appliance after attachments have been installed to the teeth.

Polymeric shell appliance 10 may be oriented over the crowns of the teeth of the arch. The practitioner and/or patient may apply shell appliance 10 to the teeth by lightly pressing shell 10 over the crowns of the teeth, as shown in FIG. 2. The practitioner and/or patient may continue to apply light pressure to shell appliance 10 until cavities 12 of shell appliance 10 are completely seated against the crowns, and the teeth are encapsulated in cavities 12. FIG. 2 may illustrate the teeth encapsulated in cavities 12.

Figure 3B:
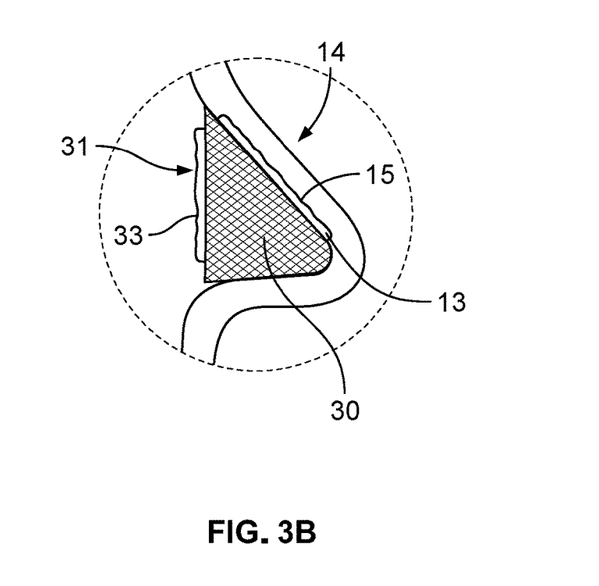
FIG. 3B shows a close-up view of an attachment (or anchor) according to certain embodiments.

FIG. 3B shows a close-up view of attachment 30.

Figure 4:
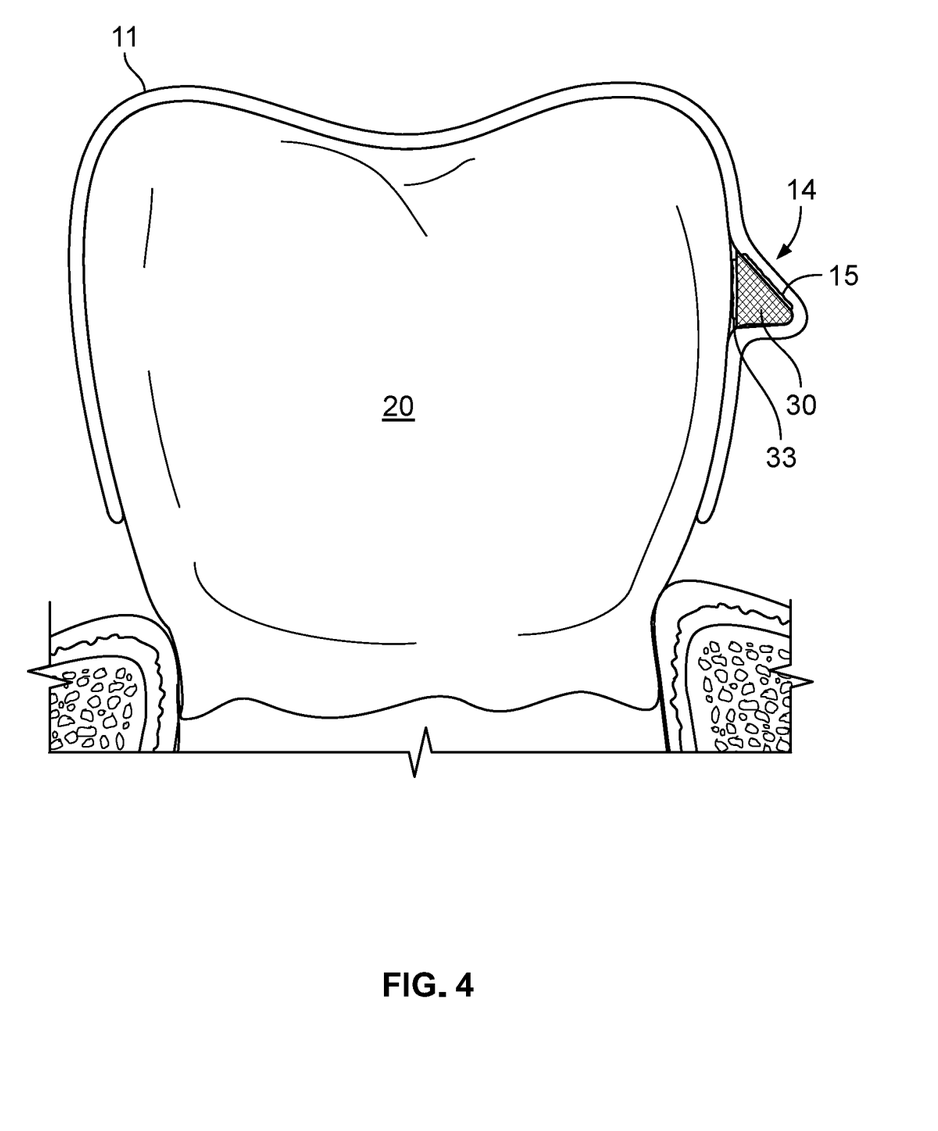
FIG. 4 shows another illustrative, elevational view of an appliance according to certain embodiments.

FIG. 4 shows body 11 in contact with tooth 20. As shown in FIG. 4, when body 11 encases tooth 20, the surface of tooth 20 may contact curable adhesive 33.

Figures 5A, 5B, 5C, 5D:
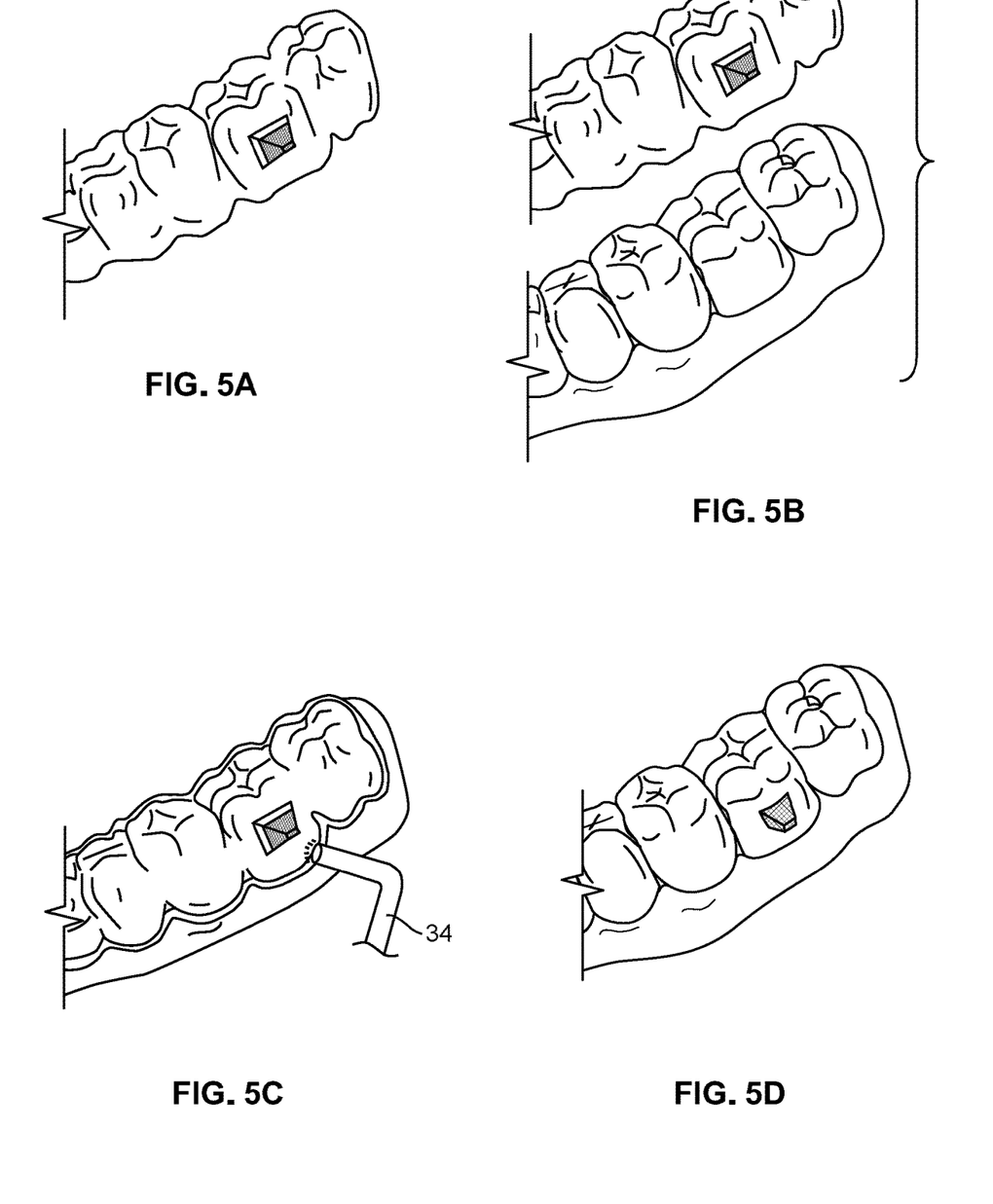
FIGS. 5A, 5B, 5C and 5D show illustrative, top-down views of an appliance with an attachment (or anchor) according to certain embodiments.
Figure 6A:
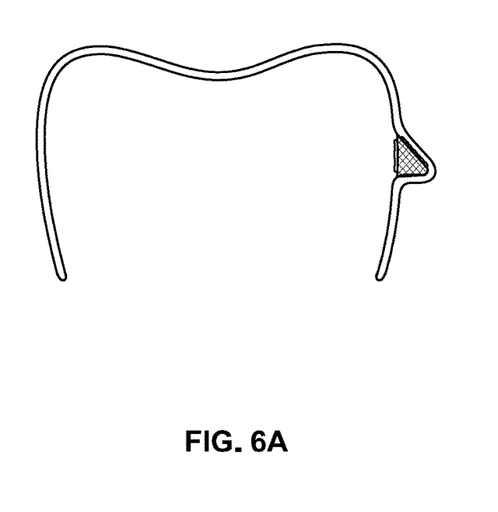
FIGS. 6A, 6B, 6C and 6D show an illustrative, elevational view of an appliance over a single tooth according to certain embodiments.
Figure 6B:
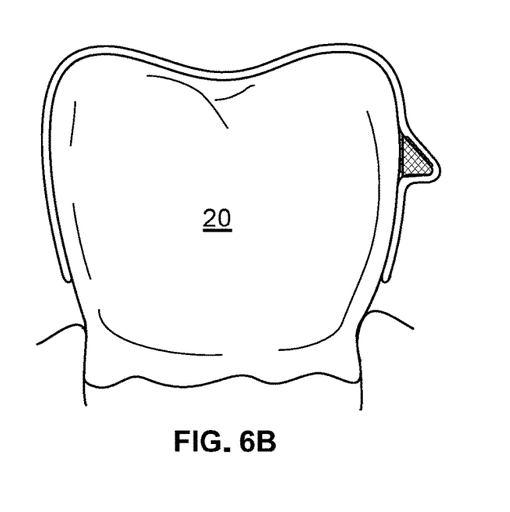
Figure 6C:
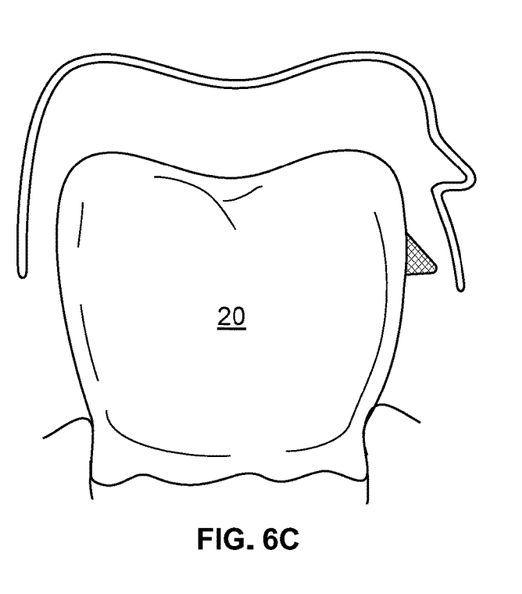
Figure 6D:
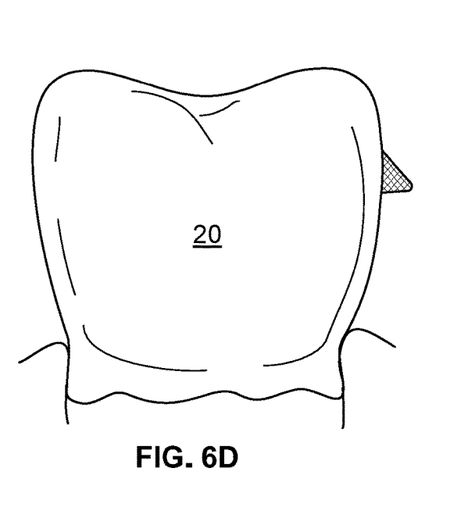

FIGS. 5A, 5B, 5C and 5D show a method of application of attachment 30 to tooth 20 in a perspective view. FIG. 5A shows shell appliance 10 with attachment 30 located therein. FIG. 5B shows polymeric shell appliance 10 being fitted on the arch of the patient.

FIG. 5C shows that once polymeric shell appliance 10 is fitted on the arch of the patient, curable dental adhesive 33, which was pre-applied to base 31 of attachment 30, may contact the respective tooth in a predetermined target location. This curable adhesive may be UV curable. This UV curable adhesive may be activated by exposure of the adhesive to ultraviolet light from curing gun 34 applied by a practitioner. When polymeric shell appliance 10 is correctly situated, and is providing proper alignment of attachment 30, the curing light may be applied to the teeth. The curing light may be applied to the teeth through the clear polymeric shell. The curing light may activate/set the adhesive and bond base 31 to the surface of tooth 20.

FIG. 5D shows that, after the adhesive between attachment 30 and tooth 20 has set, and attachment 30 is bonded to tooth 20, the releasably adhesive bond, created by releasable adhesive 15, located between shell 10 and attachment 30, can be broken. The bond may be broken using a variety of methods, such as application of the requisite pressure. Accordingly, the practitioner may remove shell 10 by applying a force, to shell 10, sufficient to break the bond between shell 10 and attachment 30.

Another method of removal of shell 10 may include moving polymeric shell appliance 10 occlusally toward the opposite arch, thereby causing adhesive 15 to release from attachment 30. Attachment 30 may remain bonded to tooth 20. Upon bonding of attachment 30 to tooth 20, the practitioner may then remove the non-treatment polymeric shell appliance 10, which may have been used to place and set attachment(s), from the patient's mouth. Once shell appliance 10 is removed from a patient's mouth, the patient may begin treatment by applying an initial orthodontic aligner to the specific arch for which it was designed.

In some embodiments, in addition to positioning and installing attachments prior to aligner treatment, shell 10 may be configured to act as the first stage of aligner treatment and apply forces to the patient's teeth. In such embodiments, after installation of the attachment to the teeth, the aligner may be worn by the patient for a predetermined time period to effect a requisite amount of movement of the patient's teeth. Upon completion of the predetermined time period, appliance 10 may be removed and the patient may wear a subsequent-stage aligner. The subsequent-stage aligner may be engaged with, or make contact with, the attachments remaining from the first aligner stage.

The locations of receptacles 14 and/or 16 may be located within cavities 12 on body 11. The locations may be based on three-dimensional scan data that reflects (or captures) the teeth. The three-dimensional scan data may be the output of a three-dimensional scan of the pre-treatment malocclused condition of the teeth. 3D scan data of a patient's teeth in their pre-treatment positions may be received by a computer system. The computer system may segment the teeth. The computer system may design an aligner treatment plan comprising several stages of treatment. The design may be completed in an automatic manner. The design may be completed with operator assistance. Each aligner included in the treatment may move teeth to successive intermediate positions. Each of the intermediate aligner stages may move the teeth closer to a desired final treatment outcome. In the event that the treatment plan includes the initial application of attachments to the teeth, attachments of specific sizes and shapes can be automatically generated and be positioned to be applied to specific teeth on the 3D representation of the patient's dentition. Then an aligner can be designed with receptacles 14 and/or 16 to receive and interact with the attachments. The attachments and positioning thereof may generate the requisite forces to achieve desired tooth movements across the stages of treatment.

In another embodiment, an operator may be involved in digitally staging the aligner treatment plan on a computer system. The operator may retrieve an attachment from a library of attachments. The operator may then manipulate and apply the retrieved attachments to a digital dental model. Once an acceptable treatment plan that incorporates the use of attachments into multiple stages of aligners has been developed, aligners may be manufactured. The newly manufactured aligners may include corresponding receptacles for placement of the attachments therein. Alternatively, a corresponding non-treatment aligner may be designed for each aligner stage for use in placement and bonding of attachments to the patient's teeth.

Custom attachments can be designed using a 3D image of the patient's pre-treatment dentition. The custom attachments may make it possible to conform the base of the attachment to the labial surface of the patient's teeth. However, even when the appliance is not custom or is not completely customized, attachments can be curved to conform to the average contours of the respective teeth.

Manufacture of shells 10 may be accomplished by any of several methods. The methods may use various types of equipment responsive to three-dimensional data of the patient's teeth. Such methods may include direct manufacturing by 3D printing. Such methods may include thermoforming atop molds made on 3D data driven equipment.

FIG. 6 shows a single tooth view of steps of a method of application of shell 10 over tooth 20. FIG. 6A shows shell 10 and attachment 30 included therein with removable adhesive. FIG. 6B shows shell 10 encompassing tooth 20. A curing light may be applied to attachment 30 through shell 10 in order to bond attachment 30 to tooth 20. FIG. 6C shows shell 10 being removed from tooth 20 upon bonding of attachment 30 to tooth 20. FIG. 6D shows attachment 30 bonded to tooth 20.

Figure 7A:
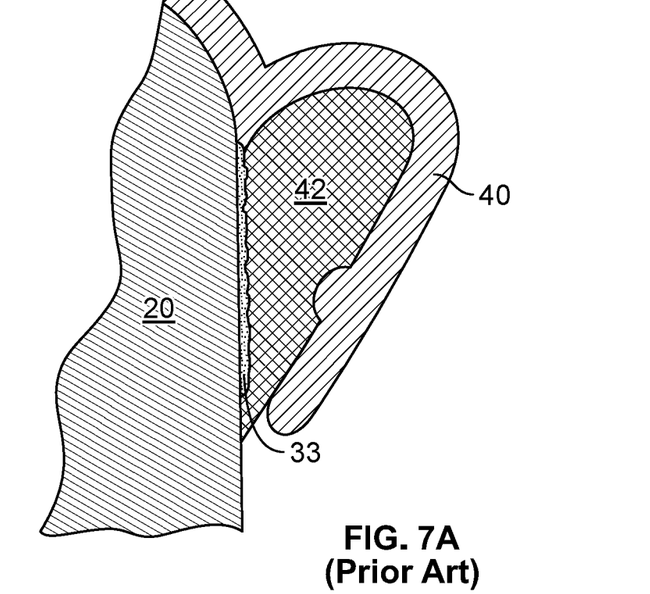
FIG. 7A shows a prior art system.

FIG. 7A shows an enlarged portion of a prior art system. Aligner 40 may be filled with flowable-dental-composite material to create attachment 42. Attachment 42 may be formed by hardening/curing a flowable dental composite. Once cured, curable adhesive 33 may be used to bond attachment 42 to tooth 20. It should be appreciated that flowable material has many disadvantages, as described in greater detail in the background of the invention. Included in those disadvantages may be flowable material may be difficult to manipulate, require a large amount of patient chair time, and result in inconsistent attachment dimensions which vary from that which was planned during digital case setup.

Figure 7B:
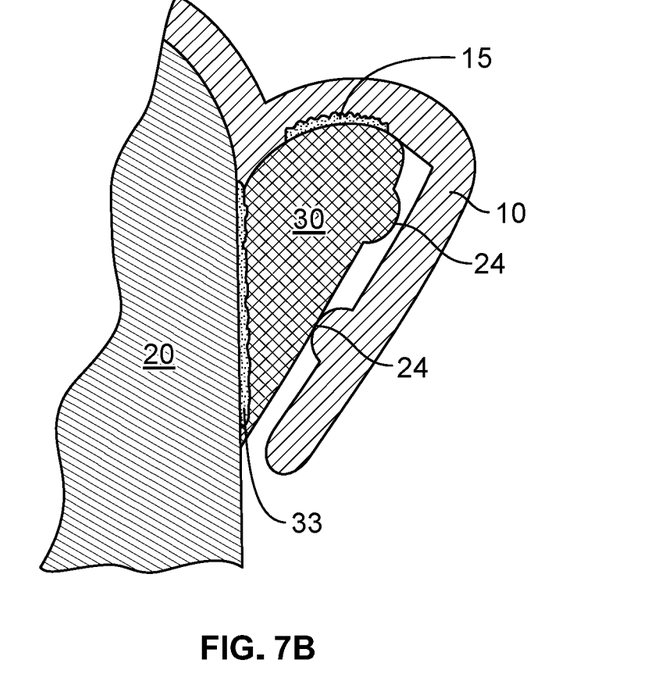
FIG. 7B shows an illustrative system for use according to certain embodiments.

FIG. 7B shows custom pre-formed attachment 30 releasably attached to appliance/aligner 10 by releasable adhesive 15. Curable adhesive 33 may be used to attach attachment 30 to tooth 20.

It should be appreciated that, in FIG. 7B, releasable adhesive 15 may be embedded in appliance 10. It should also be appreciated that adhesive 33 may be embedded in attachment 30.

A system in accordance with the present invention allows for limitless attachment designs and more accurate placement of attachments. Because formation of the attachment is not limited to form in accordance with the dimensions of the cavity as is the case for flowable dental composites used in the creation of attachments in conventional systems, custom pre-formed attachments allow for the use of customizable attachments. Custom pre-formed attachments can be applied and installed using the first aligner of a treatment sequence. As shown in FIG. 7B, custom pre-formed attachments may not be dependent on the shape of the aligner cavity. While a specific attachment design is shown in FIG. 7B for illustrative purposes, it is to be understood that a system in accordance with the present invention allows for attachment designs which deviate from the strict dimensions of the aligner and aligner cavities. The custom pre-formed attachment may be designed to include predetermined contact points 24 between the aligner and the attachment allowing for the creation of forces on the teeth which are not possible with conventional systems for designing and applying attachments which rely on the curing of flowable materials within a cavity of the aligner.

A first non-treatment aligner may be designed specifically for use in placing and securing attachments at specified locations on the teeth. The first aligner may be separate and distinct from aligners to be used in treatment. The first aligner may be similar to a bonding placement jig.

Once the attachments are bonded, as described above, the first non-treatment aligner can be discarded, and the first treatment aligner can be applied to the teeth. The first non-treatment aligner can be configured to apply the attachments at a predetermined offset in order to create a more effective force when the treatment aligners are applied. In other words, the attachment should create a force on the aligner during treatment. As described in the background, conventional techniques include guesswork, rely on the first aligner for the treatment process to both create and set attachments and require a practitioner to apply the attachments to the teeth. Embodiments of the invention provide a solution that does not require a practitioner to apply a dental composite inside the aligner. Embodiments of the invention also remove the guesswork associated with aligner placement, because a template aligner is provided, which, when placed on the teeth, put the attachment in the precise location designed by the treatment plan. It should be noted that the location for placement of the attachment designed by the treatment plan may be different or offset from the respective position and configuration of the corresponding receptacle designed in the treatment aligner(s) for interacting with the attachment. Such an offset can be used to control force vectors and create custom-designed teeth movements.

When a non-curable adhesive is used to bond the attachments, this system allows patients to self-apply attachments without a visit to the orthodontist and/or dentist. Currently, more complicated aligner cases cannot be completed without practitioner intervention because the practitioner must apply attachments to the teeth at multiple stages of treatment. Embodiments of the invention would remove the necessity for the orthodontist to apply attachments because the aligner treatment plan would come with non-treatment aligner(s) preloaded with attachments with pre-applied adhesive. In some embodiments, a curable adhesive can be used with patient-applyable attachments. In these embodiments, a patient-applyable curing light device may be used by the patient to cure the adhesive.

Figure 7C:
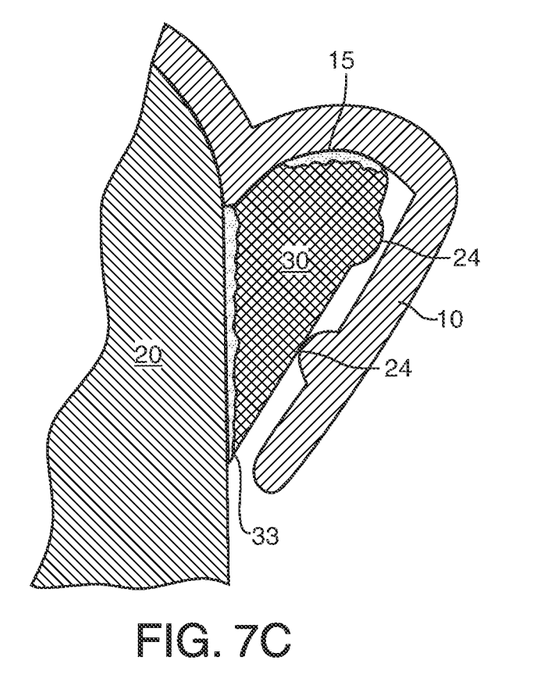
FIG. 7C shows another illustrative system for use according to certain embodiments.

FIG. 7C shows custom pre-formed attachment 30 releasably attached to appliance/aligner 10 by releasable adhesive 15. Curable adhesive 33 may be used to attach attachment 30 to tooth 20.

It should be appreciated that, in FIG. 7C, releasable adhesive 15 may be embedded in attachment 30. It should also be appreciated that adhesive 33 may be embedded in attachment 30.

Figure 7D:
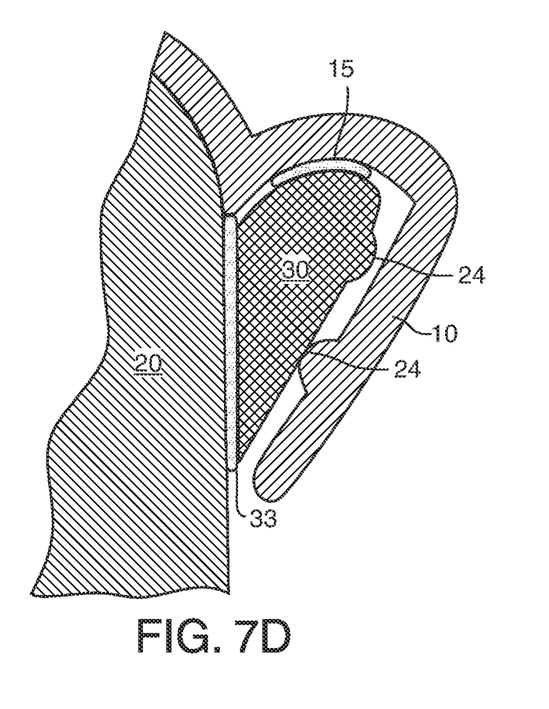
FIG. 7D shows yet another illustrative system for use according to certain embodiments.

FIG. 7D shows custom pre-formed attachment 30 releasably attached to appliance/aligner 10 by releasable adhesive 15. Curable adhesive 33 may be used to attach attachment 30 to tooth 20.

It should be appreciated that, in FIG. 7D, releasable adhesive 15 may be adhered to attachment 30 and appliance 10. It should also be appreciated that adhesive 33 may be adhered to attachment 30 and tooth 20.

Figure 8:
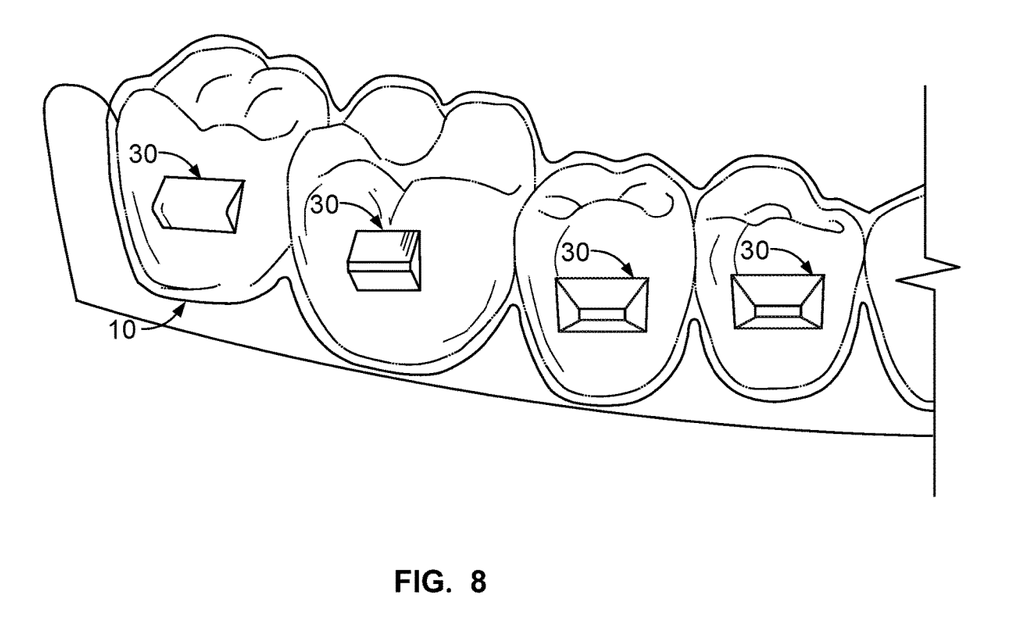
FIG. 8 shows an illustrative aligner that includes various attachments.

FIG. 8 shows aligner 10 that includes various attachments 30. Aligner 10 may be fully positioned over the teeth. In the embodiment shown in FIG. 8, aligner 10 may completely cover the teeth.

One of ordinary skill in the art will appreciate that the elements and steps shown and described herein may be utilized and/or performed in other than the recited system and/or order and that one or more elements illustrated may be optional. The methods of the above-referenced embodiments may involve the use of any suitable elements, elements, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, systems and methods of manufacture of dental appliances and other appliances using 3D printing, and products produced therefrom, have been provided. Persons skilled in the art will appreciate that the present invention can be practiced by other than the described embodiments, which are presented for purposes of illustration rather than of limitation.

What is claimed is:

1. A custom dental anchor application appliance system for mounting one or more pre-formed anchors to teeth of a patient for use in orthodontic aligner treatment, the system comprising:
   at least one pre-formed dental anchor; and
   an appliance, said appliance comprising:
   a body having at least one anchor-locating area;
   wherein the body comprises a receiving structure, said receiving structure being located within the anchor-locating area, for holding the at least one pre-formed dental anchor of a predefined configuration in a fixed position and orientation relative to the body to bring a mounting surface of the anchor into contact with a mounting area on the surface of a tooth when the mounting surface of the anchor is in conforming contact with the mounting area on the surface of the tooth, and
   wherein, upon bonding of the anchor to the tooth, the receiving structure is configured to release the anchor from the body; and
   wherein:
   the anchor is a first pre-formed shape, the receiving structure is a second shape, and the first pre-formed shape does not conform to the second shape; and
   the first pre-formed shape comprises a pre-formed contact point between the anchor and the receiving structure creating a force on the tooth at the contact point.

2. The custom dental anchor application appliance system of claim 1, wherein the body comprises a shell having a plurality of cavities, wherein at least one of the cavities has geometries shaped to receive teeth and wherein at least one cavity includes the receiving structure.

3. The custom dental anchor application appliance system of claim 1, wherein the receiving structure on the body has a coating of releasable dental adhesive thereon.

4. The custom dental anchor application appliance system of claim 1, wherein the appliance is configured to be used as a first aligner of an aligner treatment procedure.

\* \* \* \* \*